United States Patent
Tomita

(10) Patent No.: US 7,992,607 B2
(45) Date of Patent: Aug. 9, 2011

(54) PNEUMATIC TIRE FOR HEAVY LOAD

(75) Inventor: Akira Tomita, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 1001 days.

(21) Appl. No.: 10/583,078

(22) PCT Filed: Dec. 14, 2004

(86) PCT No.: PCT/JP2004/018633
§ 371 (c)(1),
(2), (4) Date: May 14, 2007

(87) PCT Pub. No.: WO2005/058617
PCT Pub. Date: Jun. 30, 2005

(65) Prior Publication Data
US 2008/0000565 A1 Jan. 3, 2008

(30) Foreign Application Priority Data
Dec. 16, 2003 (JP) ................................. 2003-418301

(51) Int. Cl.
*B60C 11/04* (2006.01)
*B60C 11/12* (2006.01)
*B60C 11/13* (2006.01)
(52) U.S. Cl. ......... 152/209.19; 152/209.21; 152/209.24; 152/209.27; 152/DIG. 1; 152/DIG. 3; 152/901
(58) Field of Classification Search ............. 152/209.19, 152/209.21, 209.22, 209.23, 209.24, 209.27, 152/DIG. 1, DIG. 3, 901
See application file for complete search history.

(56) References Cited

U.S. PATENT DOCUMENTS

| 2,272,879 | A | * | 2/1942 | Hargraves | 152/DIG. 3 |
| 3,664,402 | A | * | 5/1972 | Montagne | 152/209.24 |
| 4,865,099 | A | * | 9/1989 | Goergen | 152/209.21 |
| 5,211,781 | A | * | 5/1993 | Adam et al. | 152/DIG. 3 |
| 5,355,922 | A | * | 10/1994 | Kogure et al. | 152/209.18 |
| 5,445,201 | A | * | 8/1995 | Kukimoto et al. | 152/209.19 |
| 6,192,953 | B1 | | 2/2001 | Fukumoto | |
| 6,591,880 | B1 | * | 7/2003 | Matsumoto et al. | 152/209.19 |
| 2007/0251622 | A1 | * | 11/2007 | Tomita | 152/209.24 |

FOREIGN PATENT DOCUMENTS

| JP | 02-088311 A | 3/1990 |
| JP | 2-169305 A | 6/1990 |

(Continued)

OTHER PUBLICATIONS

Machine translation for Japan 2000-238508 (no date).*

(Continued)

*Primary Examiner* — Steven D Maki
(74) *Attorney, Agent, or Firm* — Sughrue Mion, PLLC

(57) ABSTRACT

A pneumatic tire for heavy load enabling the co-existence of wet performance and uneven wear resistance performance is provided. The pneumatic tire for heavy load includes three circumferential main grooves 31 and 33 extending on a tread in the circumferential direction, and ribs 11 and 12 defined by these circumferential main grooves 31 and 33. The centerline of the center circumferential main grove 31 among the three circumferential main grooves is positioned on the equator line of the tread, and a thin rib-shaped uneven abrasion sacrificing part (BCR) 21 having a step in a clearance thereof from the surface of the tread is formed only in the center circumferential main groove 31.

5 Claims, 6 Drawing Sheets

FOREIGN PATENT DOCUMENTS

| | | | |
|---|---|---|---|
| JP | 02-212203 | * | 8/1990 |
| JP | 6-8711 A | | 1/1994 |
| JP | 07-251608 | * | 10/1995 |
| JP | 09-011708 | * | 1/1997 |
| JP | 10-6715 A | | 1/1998 |
| JP | 10-100616 A | | 4/1998 |
| JP | 11-222014 A | | 8/1999 |
| JP | 2000-238508 A | | 5/2000 |
| JP | 2000-238508 | * | 9/2000 |
| JP | 2002-19421 A | | 1/2002 |
| JP | 2002-254905 | * | 9/2002 |
| JP | 2002-254905 A | | 9/2002 |

OTHER PUBLICATIONS

Machine translation for Japan 09-011708 (no date).*
Machine translation for Japan 07-251608 (no date).*
Machine translation for Japan 2002-254905 (no date).*

* cited by examiner

Fig.1
(a)
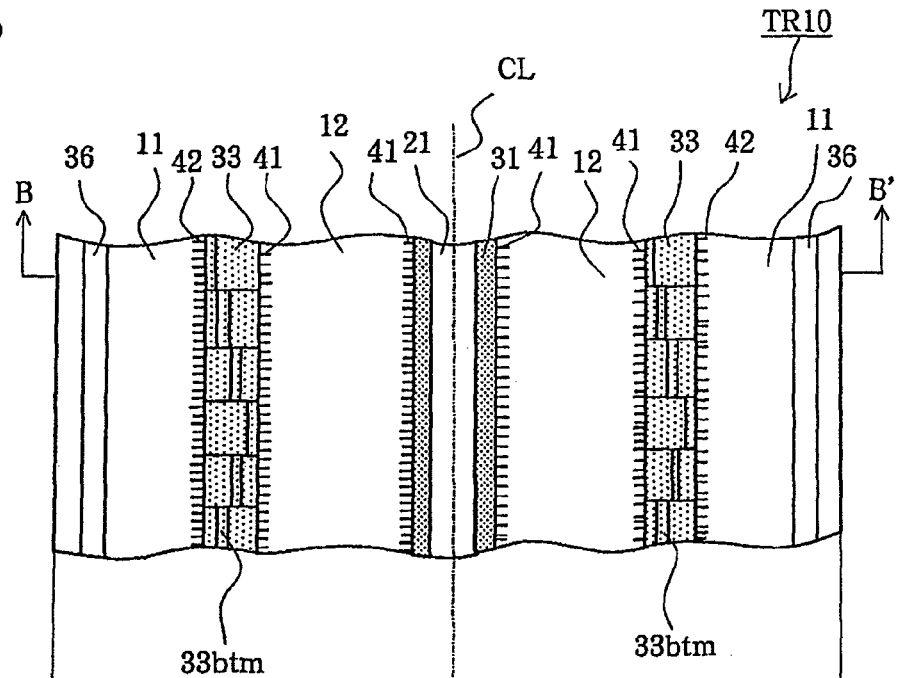
(b)
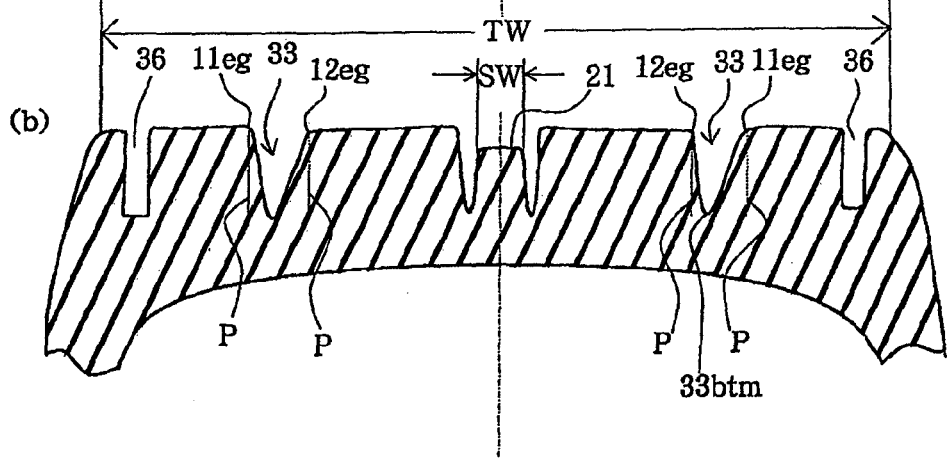
(c)
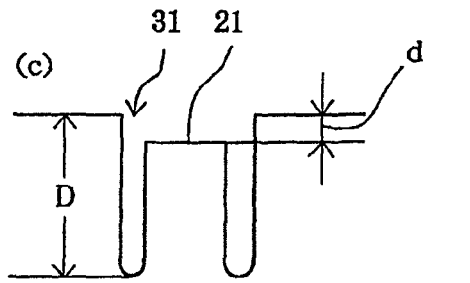
(d)
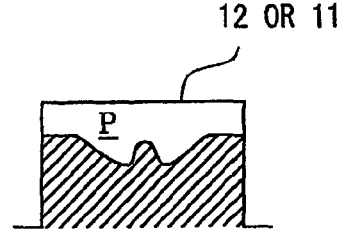

PNEUMATIC TIRE FOR HEAVY LOAD

TECHNICAL FIELD

The present invention relates to a pneumatic tire for heavy load, and more particularly to a pneumatic tire for heavy load enabling the co-existence of uneven wear resistance performance and drainage performance by improving a tread pattern.

BACKGROUND ART

Conventionally, in a pneumatic tire for heavy load, in order to suppress uneven wear of a shoulder rib, a method has been widely used in which a thin rib-shaped uneven abrasion sacrificing part (hereinafter abbreviated as BCR) having a step in a clearance thereof from the surface of a tread is formed in a circumferential main groove, and in which the BCR generates shearing force in the opposite direction to the traveling direction of a vehicle to reduce shearing force working on an edge portion of the shoulder rib body in the traveling direction (see Patent Document 1).

FIG. 6(a) illustrates a partial plan exploded view of a tread of a pneumatic tire for heavy load having BCRs. Meanwhile, FIG. 6(b) illustrates a cross-sectional view of the pneumatic tire for heavy load illustrated in FIG. 6(a) as taken in the A-A' direction.

As illustrated in FIGS. 6(a) and 6(b), a tread TR10 includes linear circumferential grooves 131 provided thereon at opposite sides of a tire equator line CL, and center ribs 112 are provided at the outer sides of the respective circumferential grooves 131. Further, linear circumferential grooves 132 are provided at the outer sides of the center ribs 112. Each of the circumferential grooves 132 includes a BCR 121 formed therein, and the BCR 121 has a step in a clearance thereof from the surface of the tread TR10. Furthermore, shoulder ribs 111 are provided at the outer sides of the circumferential grooves 132.

In the conventional pneumatic tire for heavy load as illustrated in FIG. 6, the shearing force (shearing distortion) working in the opposite direction to the traveling direction of a vehicle is generated due to the step region formed by the BCR 121 and the circumferential groove 132.

Further, although not illustrated, Patent Documents 2 and 3 report that the BCR is also provided in a circumferential main groove which is positioned on the equator line of the tread and extends in the circumferential direction, and that the uneven wear resistance performance is improved by the BCR.

Patent Document 1: Japanese Unexamined Patent Application Publication No. 2-88311 (the scope of claims, etc.)
Patent Document 3: Japanese Unexamined Patent Application Publication No. 2000-23508 2000-238508 (the scope of claims, etc.)
Patent Document 3: Japanese Unexamined Patent Application Publication No. 2002-254905 (the scope of claims, etc.)

DISCLOSURE OF INVENTION

Problem to be Solved by the Invention

However, as described in Patent Document 1, the method in which the BCR 121 having the step in the clearance thereof from the surface of the tread is provided only in the circumferential groove 132 sandwiched by the center rib 112 and the shoulder rib 111 has a problem in that the method is practically ineffective against the uneven wear of the shoulder rib, and more particularly against taper wear, i.e., uneven wear of the shoulder rib 111 into a taper shape, in a circumstance in which the force working in the width direction of the tread, i.e., the lateral force, is more dominant than the force working in the circumferential direction of the tread.

Meanwhile, as described in Patent Documents 2 and 3, if the BCR is provided in all of the circumferential main grooves, the effect of suppressing the uneven wear is improved. However, the groove volume of the circumferential main grooves is reduced, and the drainage performance is deteriorated. In particular, when the lateral force is applied to the tire, the groove width is decreased, and substantial deterioration of the drainage performance is induced. Therefore, as well as the provision of the BCR, a measure needs to be taken to ensure the wet performance. However, if sipes are provided in an approximately width direction of the tire on the entirety of the rib sandwiched by the circumferential grooves in order to improve the wet performance, there arises a problem in that heel-and-toe uneven wear is caused by the sipes. Thus, the co-existence of the wet performance and the uneven wear resistance performance is not easy by any means.

It is therefore an object of the present invention to provide a pneumatic tire for heavy load resolving the above-described problems and enabling the co-existence of the wet performance and the uneven wear resistance performance.

Means to Solve the Problem

To solve the above problems, the present inventor has conducted a keen examination focusing on the mechanism of the shearing force (shearing distortion) generated in the opposite (negative) direction to the traveling direction of a vehicle due to the step region formed by the circumferential groove of the tread and the BCR provided therein. Consequently, the present inventor has found that the circumferential shearing distortion generated in the opposite (negative) direction is transmitted to surrounding areas via a belt provided inside the tire. Consequently, it has been found that the shearing distortion in the opposite (negative) direction is spread across a wide area of the tread by providing the circumferential groove having the BCR at the center area of the tire at which the belt stiffness and the belt tension become the greatest, and that uneven wear can be suppressed across the entire tread even if the BCR is not provided in the other circumferential grooves. Thereby, the present invention has been accomplished.

That is, a pneumatic tire for heavy load according to the present invention is a pneumatic tire for heavy load including three circumferential main grooves extending on a tread in the circumferential direction, and ribs defined by these circumferential main grooves. The pneumatic tire for heavy load is characterized in that the centerline of the center circumferential main grove among the three circumferential main grooves is positioned on the equator line of the tread, and that a thin rib-shaped uneven abrasion sacrificing part (BCR) having a step in a clearance thereof from the surface of the tread is formed only in the center circumferential main groove.

According to the present invention, the action of the BCR is spread across the entire width of the tread, and the uneven wear of the tread can be effectively suppressed even if the BCR is not provided in the remaining circumferential grooves. Meanwhile, in a case in which the BCR is provided only in the two remaining circumferential grooves, the action of the BCR is spread only in the vicinity areas thereof. Further, in a case in which the BCR is provided in the two circumferential grooves at the shoulder sides among the four circumferential grooves, as illustrated in FIG. 6, the width of each of the ribs becomes equal to or smaller than 20% of the entire tread width. As a result, the shearing distortion in the width direction is increased at a turn, and the effect of suppressing the uneven wear cannot be sufficiently obtained.

In the present invention, it is preferable to set the width of the BCR to be equal to or larger than 2% of the width of the tread to cause the action of the BCR to be sufficiently exerted. However, if the width of the BCR exceeds 10% of the width of the tread, deterioration of the drainage performance of the circumferential main groove is induced, which is not preferable. Further, similarly to cause the action of the BCR to be sufficiently exerted, it is preferable that, when the step of the BCR formed in the clearance thereof from the surface of the tread is indicated by d, and when the depth of the center circumferential main groove is indicated by D, the relationship expressed by the formula $0.7D \leq (D-d) \leq D-3$ mm is satisfied.

Further, in the present invention, it is preferable that circumferential thin grooves are provided at the outer sides of the opposite-side circumferential main grooves. The circumferential thin grooves have a function to prevent occurrence of step wear which can continuously occur at opposite end portions of the tread in the circumferential direction.

Furthermore, in the present invention, the opposite-side circumferential main grooves among the three circumferential main grooves may be ordinary grooves. Further, it is preferable that the position of the deepest groove portion of each of the opposite-side circumferential main grooves changes along the circumferential direction of the tire in the circumferential main groove at a predetermined interval in the width direction of the tread, and depth-direction positions at which perpendicular lines perpendicular or approximately perpendicular to the surface of the tread and passing through edges of the ribs at the sides of the circumferential main groove are in contact with a groove bottom base of the circumferential main groove, and angles each of which includes the corresponding depth-direction position as a vertex and is formed by the corresponding perpendicular line and a cross-sectional line of the groove bottom surface extending in the width direction of the tread, change along the circumferential direction at a predetermined interval. Accordingly, when the lateral force is input to the tire, the position at which the groove bottom base of the circumferential main groove and a side surface of the corresponding shoulder rib are deformed is dispersed, and contraction of the circumferential main groove, i.e., displacement of the shoulder rib in the width direction of the tread can be suppressed. Consequently, the shearing force toward the inside of the tread generated when the shoulder rib is kicked out can be reduced. Therefore, the uneven wear of the shoulder rib, and more specifically the wear of only one of the edges of the shoulder rib or the like, the taper wear, and the heel-and-toe wear can be suppressed.

Further, in the configuration in which the position of the deepest groove portion of the opposite-side circumferential main grooves are changed along the circumferential direction at the predetermined interval, as described above, it is more preferable that, when a maximum groove cross-sectional area S indicates the area of a quadrangle formed by the respective edges of the ribs at the sides of the corresponding circumferential main groove and respective intersection points at which a parallel line in contact with the deepest groove portion and parallel to the surface of the tread perpendicularly intersects the perpendicular lines perpendicular or approximately perpendicular to the surface of the tread and passing through the edges, an effective groove cross-sectional area S' corresponding to a portion forming the circumferential groove across the entire circumstance of the tread satisfies $S' \geq 0.45S$. Accordingly, the drainage performance can be further improved, while suppressing the uneven wear of the shoulder rib caused by the contraction of the circumferential main groove.

In this case, the effective groove cross-sectional area (S') represents a virtual cross-sectional area, i.e., a see-through portion, formed by connecting innermost points and lines of an outline of the circumferential main groove in the cross-section along the width direction of the tread, when the outline is transparently displayed across the entire circumference of the tread. That is, the effective groove cross-sectional area (S') corresponds to a groove cross-sectional area through which the water flowed into the circumferential main groove can smoothly flow without being interrupted by the groove bottom surface of the circumferential main groove and the side surfaces of the ribs.

Further, in the present invention, to increase the wet performance, groove walls of the ribs may be provided with multiple sipes. It is preferable that each of the multiple sipes has a width of equal to or larger than 1 mm and a circumferential interval of equal to or smaller than 10 mm. However, to prevent the uneven wear, each of the ribs may not be provided with sipes across the entirety of the rib in the width direction thereof, or may be provided with the sipes each having a cross-sectional area equal to or smaller than a half of a cross-section of the rib in the width direction thereof.

Effect of the Invention

According to the present invention, a pneumatic tire for heavy load enabling the co-existence of the wet performance and the uneven wear resistance performance can be provided.

BRIEF DESCRIPTION OF THE DRAWINGS

FIG. 1 presents a partial plan exploded view and cross-sectional views in a tread width direction of a tread of a pneumatic tire according to a first embodiment of the present invention.

Figure 2:
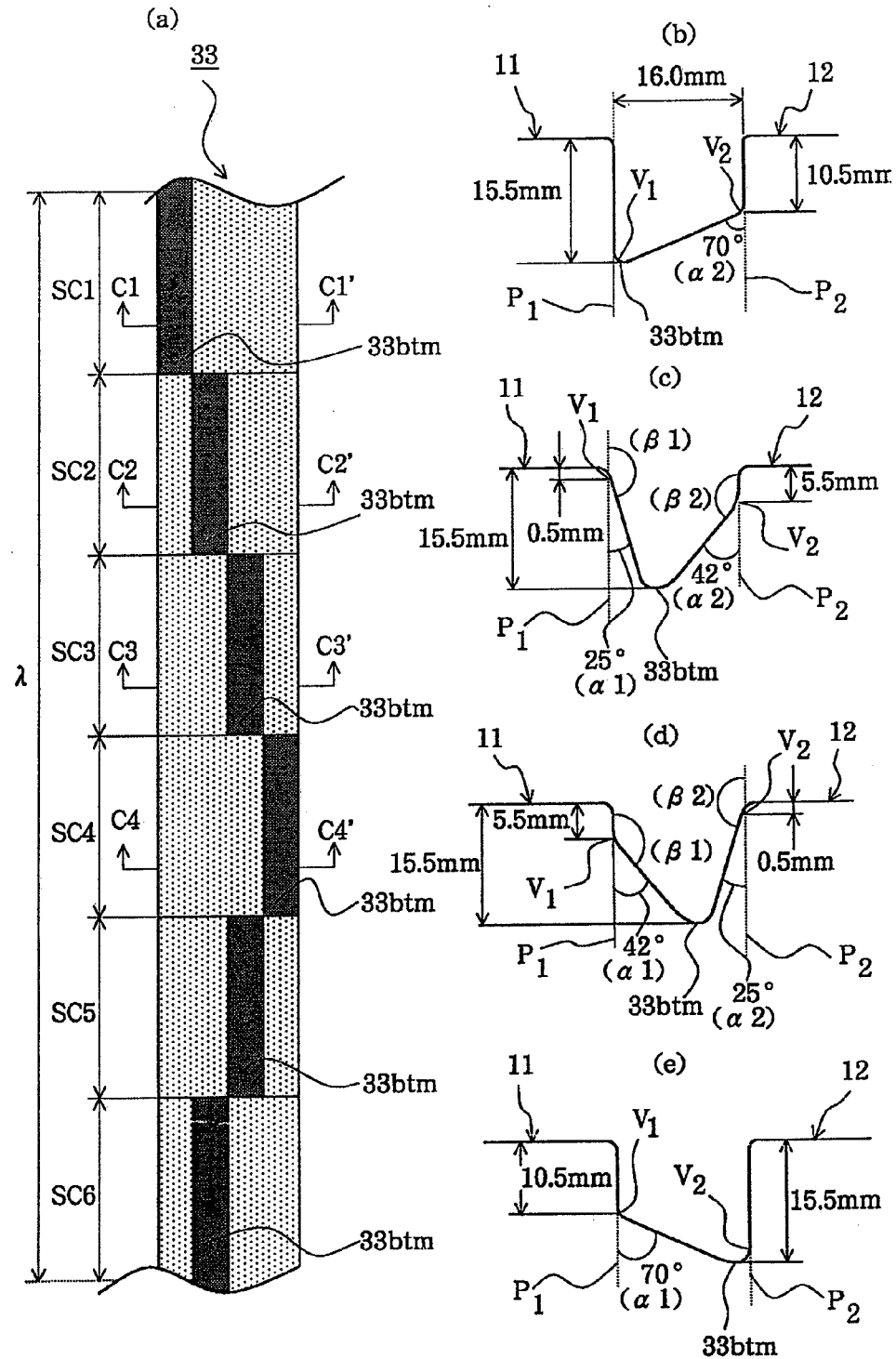
FIG. 2 presents diagrams illustrating a configuration of a circumferential groove provided on the pneumatic tire according to the first embodiment of the present invention.

REFERENCE NUMERALS 11 shoulder rib
11*eg*, 12*eg* edge portions
12 center rib
21 thin rib-shaped uneven abrasion sacrificing part (BCR)
31, 33 circumferential main grooves
33*btm* deepest groove portion
36 circumferential thin groove
41, 42 multiple sipes
TR10 tread CL tire equator line
D circumferential main groove depth
d step between BCR and tread surface
P, $P_1$, $P_2$ perpendicular lines
S maximum groove cross-sectional area
$S_1'$, $S_2'$, $S_3'$ effective groove cross-sectional areas
SC1 to SC6 sections
$V_1$, $V_2$ contact points
W lateral width

BEST MODE FOR CARRYING OUT THE INVENTION

With reference to the drawings, embodiments of the present invention will be specifically described below.

FIG. 1(a) is a partial plan exploded view of a tread of a pneumatic tire for heavy load according to an embodiment (hereinafter referred to as the "first embodiment") of the present invention. FIG. 1(b) is a cross-sectional view of the pneumatic tire for heavy load illustrated in FIG. 1(a) as taken in the B-B' direction.

As illustrated in FIGS. 1(a) and 1(b), a tread TR10 includes three circumferential main grooves 31 and 33 extending in the circumferential direction, and center ribs 12 and shoulder ribs 11 defined by these circumferential main grooves. The centerline of the center circumferential main groove 31 among the three circumferential main grooves is positioned on the equator line CL of the tread. Further, a BCR 21 having a step in a clearance thereof from the surface of the tread is formed in the circumferential main groove 31.

The width SW of the BCR 21 is 5.5% of the width TW of the tread. Further, in FIG. 1(c) illustrating an enlarged cross-section of the circumferential main groove 31, the step d from the surface of the tread is 3.5 mm, and the depth D of the circumferential main groove 31 is 14 mm. Furthermore, the width of the circumferential main groove 31 is 20 mm.

Circumferential thin grooves 36 are provided at the outer sides of the circumferential main grooves 33. The circumferential thin grooves 36 are positioned in opposite end regions, each of which occupies equal to or smaller than 10% of the width TW of the tread from a corresponding end of the tread. Further, the depth of each of the circumferential thin grooves 36 is 14 mm, and the width of the circumferential thin groove 36 is 1.5 mm.

Further, the center ribs 12 and the shoulder ribs 11 are provided with multiple sipes 41 and 42 (width: 3 mm, circumferential interval: 5 mm), respectively. In the first embodiment, each of the ribs is not provided with sipes across the entirety of the rib in the width direction thereof. If such sipes are provided, as illustrated in FIG. 1(d), the depth of each of the sipes is set to be a cross-sectional area (P) which is equal to or smaller than a half of a cross-sectional area of the rib in the width direction thereof.

In FIG. 1(b), a belt, a carcass ply, and so forth are provided below the circumferential main groove 31 and the circumferential main grooves 33, i.e., at the inner side of the tire in the radial direction thereof. In the drawings concerning the present first embodiment, their illustration is omitted.

Each of the circumferential main grooves 33 is a linear circumferential groove positioned between the corresponding shoulder rib 11 and the corresponding center rib 12.

As illustrated in FIG. 1(a), in the circumferential main groove 33, the position of the deepest groove portion 33btm changes along the circumferential direction of the tread TR10 at a predetermined interval in the width direction of the tread TR10.

Further, in the circumferential main groove 33, as illustrated in FIG. 1(b), depth-direction positions at which perpendicular lines P perpendicular to the surface of the tread TR10 and passing through an edge portion 11eg and an edge portion 12eg are in contact with a groove bottom surface of the circumferential main groove 33, and angles each of which includes the corresponding depth-direction position as a vertex and is formed by the corresponding perpendicular line P and a cross-sectional line of the groove bottom surface extending in the width direction of the tread TR10, change along the circumferential direction of the tread TR10 at a predetermined interval.

A specific structure of the circumferential main groove 33 will now be described with reference to FIG. 2. FIG. 2(a) illustrates an enlarged view of the circumferential main groove 33 provided on the tread TR10.

Meanwhile, FIG. 2(b) illustrates a cross-sectional view of the circumferential main groove 33 illustrated in FIG. 2(a) as taken in the C1-C1' direction. Similarly, FIGS. 2(c) to 2(e) illustrate cross-sectional views of the circumferential main groove 33 as taken in the C2-C2' direction, the C3-C3' direction, and the C4-C4' direction, respectively. Description will be made below of cross-sectional shapes of the circumferential main groove 33 in the respective cross-sections in the C1-C1' to C4-C4' directions.

Firstly, as illustrated in FIG. 2(b), in the cross-section of the circumferential main groove 33 in the C1-C1' direction, a depth-direction position (a contact point $V_1$) at which the perpendicular line P perpendicular or approximately perpendicular to the surface of the tread TR10 and passing through the edge portion 11eg (hereinafter referred to as a "perpendicular line $P_1$") is in contact with the groove bottom surface is set to be at a position apart from the surface of the tread TR10 by 15.5 mm. On the other hand, a depth-direction position (a contact point $V_2$) at which the perpendicular line P perpendicular or approximately perpendicular to the surface of the tread TR10 and passing through the edge portion 12eg (hereinafter referred to as a "perpendicular line $P_2$") is in contact with the groove bottom surface is set to be at a position apart from the surface of the tread TR10 by 10.5 mm. The "groove bottom surface" refers to a plane between the contact points $V_1$ and $V_2$ including the deepest groove portion 33btm.

Further, as illustrated in FIGS. 2(b) to 2(e), an angle which includes the contact point $V_1$ as a vertex and is formed at a side of the rotation center of the tire by the perpendicular line $P_1$ and the cross-sectional line of the groove bottom surface is referred to as an "α1," and an angle which includes the contact point $V_1$ as a vertex and is formed at a side of the surface of the tread TR10 by the perpendicular line $P_1$ and the groove bottom surface is referred to as a "β1."

Furthermore, an angle which includes the contact point $V_2$ as a vertex and is formed at the side of the center of the tire by the perpendicular line $P_2$ and the groove bottom surface is referred to as an "α2," and an angle which includes the contact point $V_2$ as a vertex and is formed at the side of the surface of the tread TR10 by the perpendicular line $P_2$ and the cross-sectional line of the groove bottom surface is referred to as a "β2." In FIG. 2(b), α2 is set to be 70°. Further, in FIGS. 2(b) to 2(e), the width of the circumferential main groove 33 is set to be 16.0 mm.

As illustrated in FIG. 2(c), in the cross-section of the circumferential main groove 33 in the C2-C2' direction, the depth-direction position at a side of the shoulder rib 11 is set to be at a position apart from the surface of the tread TR10 by 0.5 mm. Meanwhile, the depth-direction position at a side of the center rib 12 is set to be at a position apart from the surface of the tread TR10 by 5.5 mm. Further, in the cross-section of the circumferential main groove 33 in the C2-C2' direction, α1 and α2 are set to be 25° and 42°, respectively.

As illustrated in FIG. 2(d), in the cross-section of the circumferential main groove 33 in the C3-C3' direction, the depth-direction position at the side of the shoulder rib 11 is set to be at a position apart from the surface of the tread TR10 by 5.5 mm. Meanwhile, the depth-direction position at the side of the center rib 12 is set to be at a position apart from the surface of the tread TR10 by 0.5 mm. Further, in the cross-section of the circumferential main groove 33 in the C3-C3' direction, α1 and α2 are set to be 42° and 25°, respectively.

As illustrated in FIG. 2(e), in the cross-section of the circumferential main groove 33 in the C4-C4' direction, the depth-direction position at the side of the shoulder rib 11 is set to be at a position apart from the surface of the tread TR10 by 15.5 mm. Meanwhile, the depth-direction position at the side of the center rib 12 is set to be at a position apart from the surface of the tread TR10 by 10.5 mm. Further, in the cross-section of the circumferential main groove 33 in the C4-C4' direction, α1 is set to be 70°.

In the present first embodiment, by changing the cross-sectional shapes of the circumferential main groove 33 illustrated in FIGS. 2(b) to 2(e) along the circumferential direction of the tread TR10 at a predetermined interval, the position of the deepest groove portion 33btm can be changed in the circumferential main groove 33 in the width direction of the tread TR10, and the depth-direction positions of the contact points $V_1$ and $V_2$ in the circumferential main groove 33 and the angles formed by the perpendicular lines $P_1$ and $P_2$ and the cross-sectional line of the groove bottom surface (α1, α2, β1, and β2) can be changed. The depth of the deepest groove portion 33btm is set to be 15.5 mm in all of FIGS. 2(b) to 2(e).

Further, in the present first embodiment, as illustrated in FIG. 2(a), the cross-sectional shapes of the circumferential main groove 33 illustrated in FIGS. 2(b) to 2(e) change in a stepwise manner along the circumferential direction of the tread TR10 for the respective sections SC1 to SC6. The section SC5 has the same cross-sectional shape as the cross-sectional shape illustrated in FIG. 2(d), and the section SC6 has the same cross-sectional shape as the cross-sectional shape illustrated in FIG. 2(c).

When the length of the sections SC1 to SC6, i.e., the length in which the cross-sectional shape illustrated in FIG. 2(b) changes into the cross-sectional shapes illustrated in FIGS. 2(c) to 2(e) to return again to the cross-sectional shape illustrated in FIG. 2(b), is expressed as an interval (λ), it is preferable to make the interval (λ) as short as possible to increase the effect of dispersing the distortion positions of the shoulder rib 11 and the groove bottom surface. Conversely, if the interval (λ) is made long, such configuration resembles a configuration in which the side surface of the shoulder rib 11 is uniformly tilted, and the effect of suppressing the contraction of the circumferential main groove 33 in the groove circumferential direction is reduced.

Therefore, it is preferable to set the interval (λ) such that the interval (λ) is repeated at least equal to or more than twice in a ground contact length (L) of the tread TR10. The interval (λ) is set to satisfy the relationship $\lambda \leq L/2$.

The "ground contact length" refers to a length by which the tread TR10 is in contact with a road surface when the pneumatic tire for heavy load according to the present first embodiment, which has a normal internal pressure and is attached to a normal rim, is pressed against the road surface under a load corresponding to a load applied when the tire is attached to a front shaft of a vehicle.

Figure 4:
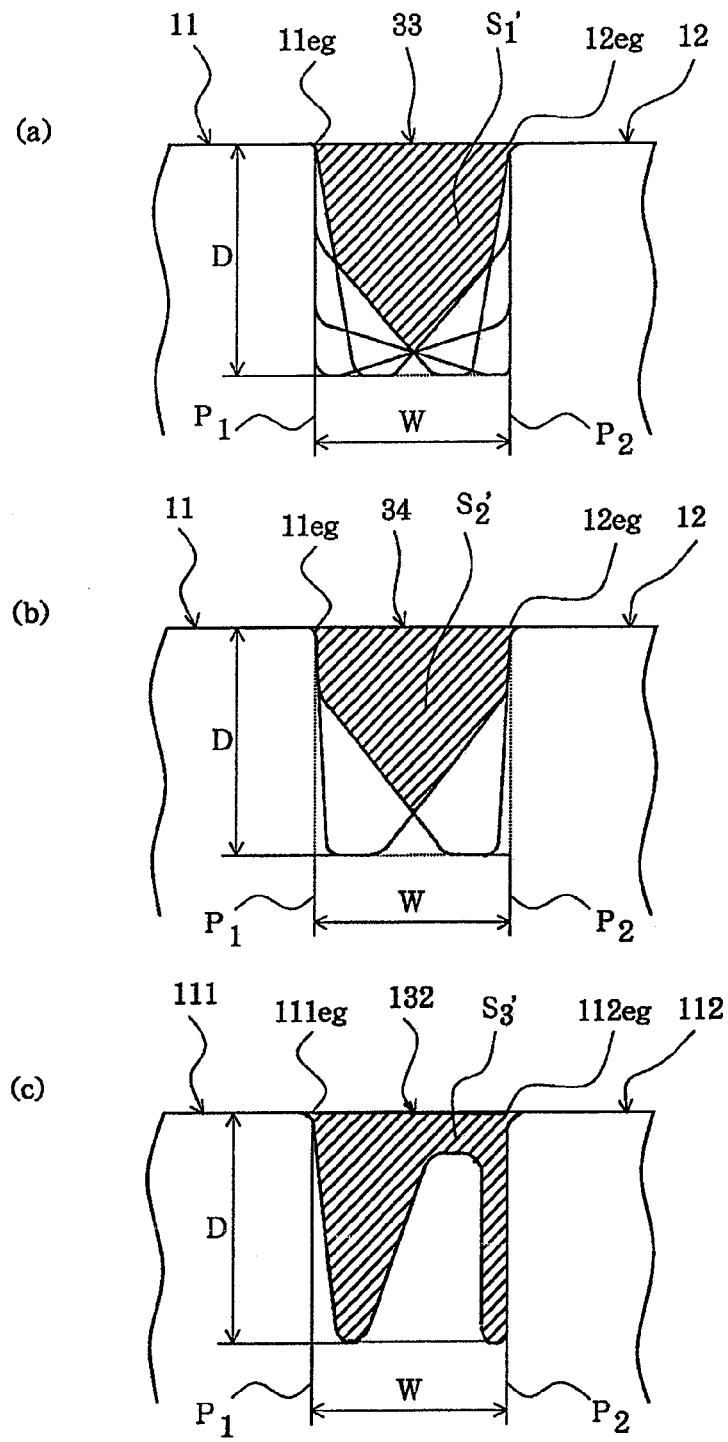
FIG. 4 presents diagrams illustrating effective groove cross-sectional areas of the circumferential grooves provided on the pneumatic tire according to the first embodiment of the present invention, the pneumatic tire according to the second embodiment, and the pneumatic tire according to a conventional example.

With reference to FIG. 4(a), an effective groove cross-sectional area (S') of the circumferential main groove 33 will now be described. The effective groove cross-sectional area refers to a groove cross-sectional area corresponding to a portion forming a circumferential groove across the entire circumference of the tread TR10 in a maximum groove area S, when the maximum groove area S refers to the area of a quadrangle formed by the respective edges of the edge portions 11eg and 12eg and respective intersection points at which the perpendicular lines $P_1$ and $P_2$ perpendicularly intersect a parallel line parallel to the surface of the tread TR10 and in contact with the deepest groove portion 33btm.

In the present first embodiment, the effective groove cross-sectional area (S') of the circumferential main groove 33, which is a region indicated by hatched lines in FIG. 4(a), satisfies $S_1' \geq 0.45S$ in the maximum groove cross-sectional area S which is expressed as the product of a groove width W and a deepest groove length D.

Description will now be made of a pneumatic tire for heavy load according to another embodiment (hereinafter referred to as the "second embodiment") of the present invention. The tire does not need any change other than a later-described circumferential main groove 34 which replaces the circumferential main groove 33 illustrated in FIG. 1. FIG. 3(a) illustrates an enlarged view of the circumferential main groove 34 provided on a tread TR11.

Further, FIGS. 3(b) and 3(c) illustrate cross-sectional views as taken in the E1-E1' direction and the E2-E2' direction, respectively. As illustrated in FIG. 3(b), in a cross-section of the circumferential main groove 34 in the E1-E1' direction, the depth-direction position at the side of the shoulder rib 11 is set to be at a position apart from the surface of the tread TR11 by 2 mm. Meanwhile, the depth-direction position at the side of the center rib 12 is set to be at a position approximately on the surface of the tread TR11. Further, in the cross-section of the circumferential main groove 34 in the E1-E1' direction, α1 and α2 are set to be 43° and 5°, respectively.

As illustrated in FIG. 3(c), in a cross-section of the circumferential main groove 34 in the E2-E2' direction, the depth-direction position at the side of the shoulder rib 11 is set to be at a position approximately on the surface of the tread TR11. Meanwhile, the depth-direction position at the side of the center rib 12 is set to be at a position apart from the surface of the tread TR11 by 2 mm. Further, in the cross-section of the circumferential main groove 34 in the E2-E2' direction, α1 and α2 are set to be 5° and 43°, respectively. Furthermore, the depth of a deepest groove portion 34btm is set to be 15.5 mm in FIGS. 3(b) and 3(c), and the width of the circumferential main groove 34 is set to be 16.0 mm in FIGS. 3(b) and 3(c).

In the pneumatic tire for heavy load according to the present second embodiment, as illustrated in FIG. 3(a), the cross-sectional shapes illustrated in FIGS. 3(b) and 3(c) are repeated at the predetermined interval (λ).

Figure 3:
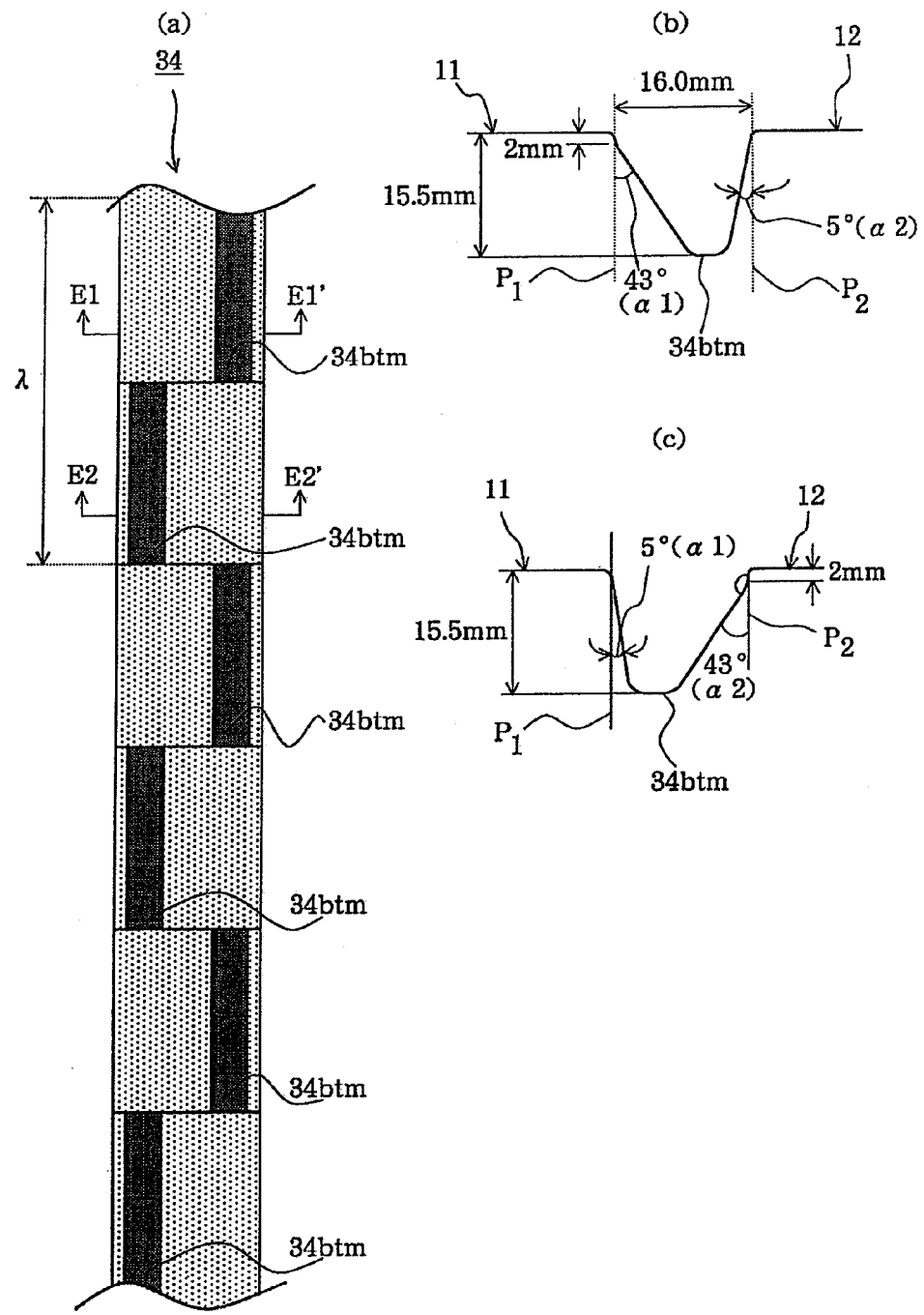
FIG. 3 presents diagrams illustrating a configuration of a circumferential groove provided on a pneumatic tire according to a second embodiment of the present invention.
Figure 5:
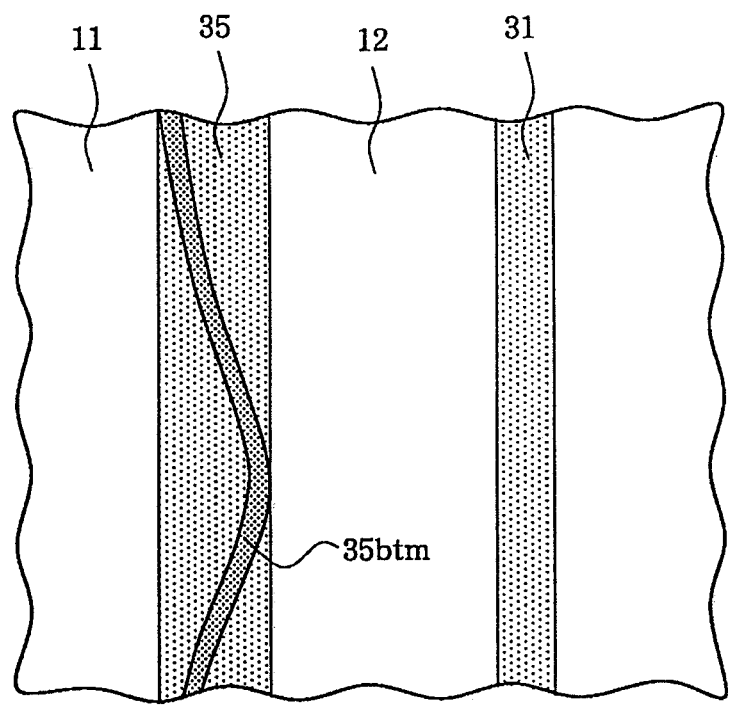
FIG. 5 presents a partial plan exploded view of a tread of a pneumatic tire according to a modified example of the present invention.

In the pneumatic tires for heavy load according to the present first and second embodiments illustrated in FIGS. 2 and 3, the deepest groove portions 33btm and 34btm of the circumferential main grooves 33 and 34, respectively, change in the stepwise manner for every predetermined section. As in a deepest groove portion 35btm illustrated in FIG. 5, in a circumferential main groove 35, the position of the deepest groove portion may be changed continuously and smoothly at a predetermined interval (which satisfies the relationship expressed by interval (λ)≦ground contact length (L)/2, for example) in the width direction of the tread.

Further, the depth-direction positions (the positions of the contact points $V_1$ and $V_2$) of the circumferential main groove 35, and the angles (α1, α2, β1, and β2) formed by the groove bottom surface and the perpendicular lines P (the perpendicular lines $P_1$ and $P_2$) may be changed continuously and smoothly at a predetermined interval.

Also in a case, such as the circumferential main groove 35, in which the position of the deepest groove portion is changed continuously and smoothly at a predetermined interval, the pneumatic tire for heavy load can exert the above-described effect of the present invention.

Embodiments

The present invention will be described below on the basis of the embodiments.

Figure 6:
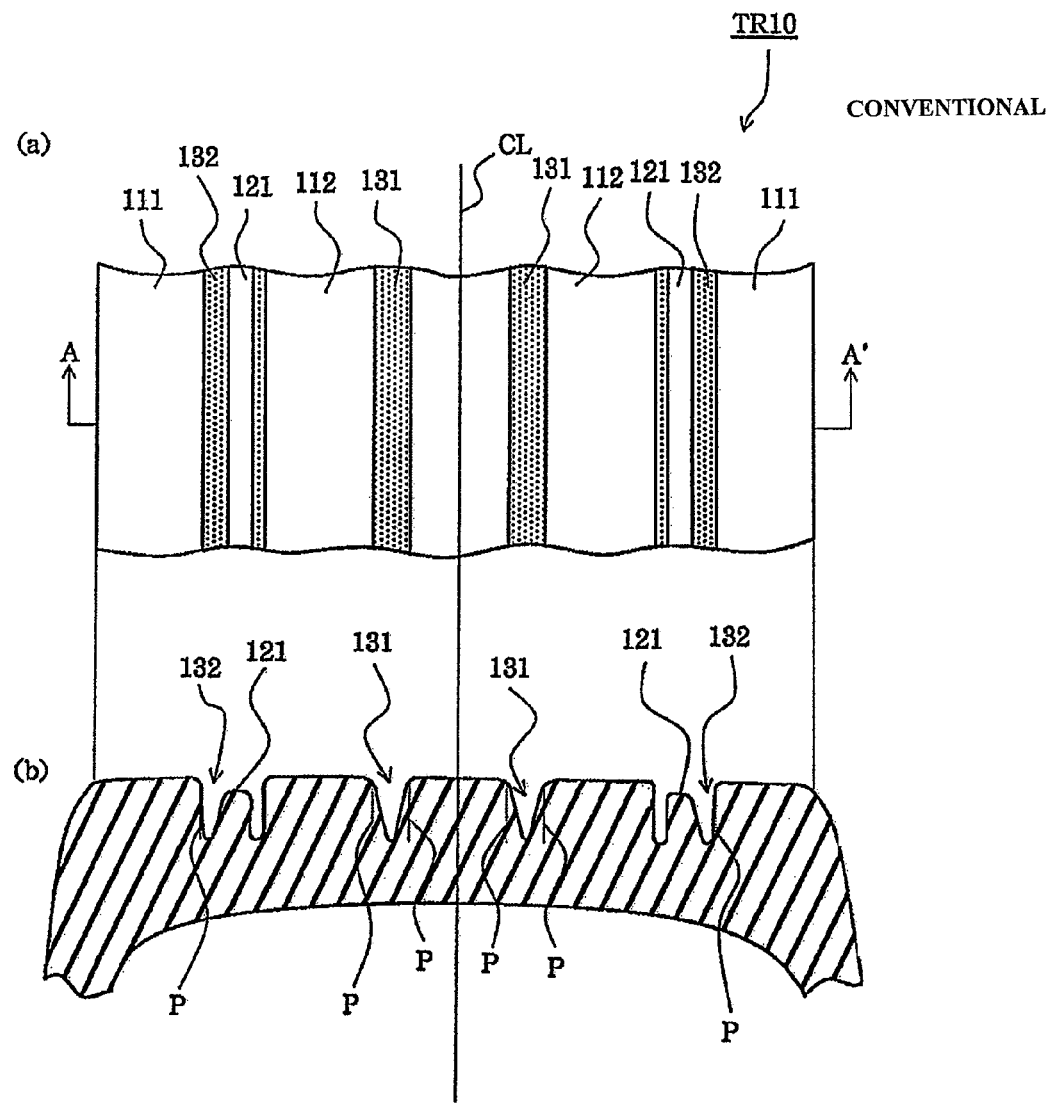
FIG. 6 presents a partial plan exploded view and a cross-sectional view in a tread width direction of a tread of the conventional pneumatic tire.

A test for comparative evaluation of the pneumatic tires for heavy load according to the present first and second embodiments and the pneumatic tire for heavy load according to the conventional example illustrated in FIG. 6 (the conventional example) was carried out under the following condition.

(1) Test Procedure

The test involving the comparative evaluation was carried out to examine (a) the shoulder rib wear performance and (b) the wet performance.

The test on (a) the shoulder rib wear performance and (b) the wet performance was carried out in a state in which each of the pneumatic tires for heavy load according to the present first embodiment, the present second embodiment, and the conventional example was actually attached to a vehicle. The test condition is as follows.

Used tire size: 295/75R22.5
Used rim size: 9.00×22.5
Set tire internal pressure: 689 kPa
Vehicle type: One front-shaft, two drive-shaft vehicle (2-DD truck)
Fixing point: Front wheel
Load on front wheel: 24.5 kN (vehicle loaded: loading ratio 100%)
Speed: 0 to 80 km/h
Travel distance: 100,000 km Further, in the test on the pneumatic tire for heavy load according to the present first embodiment, the interval (λ) of the circumferential groove was set to be 39% of the ground contact length (L), and as illustrated in FIG. 4(a), the pneumatic tire for heavy load having the effective groove cross-sectional area $S_1'$ set at 55.5% of the maximum groove cross-sectional area S was used. Furthermore, in the test on the pneumatic tire for heavy load according to the present second embodiment, as illustrated in FIG. 4(b), the pneumatic tire for heavy load having the effective groove cross-sectional area $S_2'$ set at 40.7% of the maximum groove cross-sectional area S was used. FIG. 4(c) illustrates, as a reference, the effective groove cross-sectional area $S_3'$ of the pneumatic tire for heavy load according to the conventional example illustrated in FIG. 6.

(2) Test Result (a) Shoulder Rib Wear Performance

The shoulder rib wear performance was evaluated in the shoulder rib 11 and the center rib 12, by averaging differences in the wear amount between an edge portion to which the lateral force in the width direction of the tread is input and an edge portion from which the lateral force is output, and expressing the wear (uneven wear) performance of each of the pneumatic tires for heavy load by an index, with the wear performance of the pneumatic tire for heavy load according to the conventional example being expressed as 100. The following Table 1 represents the shoulder rib wear performance of each of the present first embodiment, the present second embodiment, and the conventional example.

(b) Wet Performance

The wet performance was evaluated by measuring a braking distance required for a vehicle to decrease the speed from 80 km/h to be stopped on a road surface with a water depth of 5 mm, and expressing the braking distance of each of the pneumatic tires for heavy load by an index, with the braking distance of the pneumatic tire for heavy load according to the conventional example being expressed as 100. Table 1 represents the wet performance of each of the present first embodiment, the present second embodiment, and the conventional example.

TABLE 1

|  | Uneven wear performance (index) | Wet performance (index) |
| --- | --- | --- |
| Present first embodiment | 59 | 91 |
| Present second embodiment | 53 | 93 |
| Conventional example | 100 | 100 |

Table 1 indicates that, the smaller the value of the uneven wear performance index is, the smaller the difference in the wear amount between the both edges of each of the ribs is and the better the shoulder rib wear performance is. As indicated in Table 1, the uneven wear of the shoulder rib is substantially suppressed both in the pneumatic tires for heavy load according to the present first embodiment and the present second embodiment, compared with the pneumatic tire for heavy load according to the conventional example.

Further, Table 1 indicates that, the smaller the value of the wet performance index is, the shorter the braking distance is and the better the wet performance is. As illustrated in Table 1, the braking distance is reduced and the wet performance is improved in the pneumatic tires for heavy load according to the present first and second embodiments, compared with the pneumatic tire for heavy load according to the conventional example.

A reason for the smaller improvement in the wet performance of the pneumatic tire for heavy load according to the present second embodiment compared with the pneumatic tire for heavy load according to the present first embodiment lies in that, while the effective groove cross-sectional area $S_1'$ of the pneumatic tire for heavy load according to the present first embodiment was set to be 55.5% of the maximum groove cross-sectional area S, the effective groove cross-sectional area $S_2'$ of the pneumatic tire for heavy load according to the present second embodiment was set to be 40.7% of the maximum groove cross-sectional area S.

The invention claimed is:

1. A pneumatic tire for heavy load comprising:
   three circumferential main grooves extending on a tread in the circumferential direction; and
   ribs defined by these circumferential main grooves,
   characterized in that the centerline of the center circumferential main groove among the three circumferential main grooves is positioned on the equator line of the tread, and
   that a thin rib-shaped uneven abrasion sacrificing part having a step in a clearance thereof from the surface of the tread is formed only in the center circumferential main groove, and
   that the center circumferential main groove involves see-through groove portion extending to the straight, and that, when the step of the thin rib-shaped uneven abrasion sacrificing part formed in the clearance thereof from the surface of the tread is indicated by d, and a depth of the center circumferential main groove is indicated by D, the relationship expressed by the formula $0.7D \leqq (D-d) \leqq D-3$ mm is satisfied, wherein the width of the thin rib-shaped uneven abrasion sacrificing part is in a range of from 2 to 10% of the width of the tread, wherein the width of the thin rib-shaped uneven abrasion sacrificing part is narrower than a width of adjoining ribs, wherein the position of the deepest groove portion of each of the opposite-side circumferential main grooves changes along the circumferential direction of the tire in the circumferential main groove at a predetermined interval in the width direction of the tread, and wherein depth-direction positions at which perpendicular lines perpendicular or approximately perpendicular to the surface of the tread and passing through edges of the ribs at the sides of the circumferential main grooves are in contact with a groove bottom surface of the circumferential main groove, and angles each of which includes the corresponding depth-direction position as a vertex and is formed by the corresponding perpendicular line and a cross-sectional line of the groove bottom surface extending in the width direction of the tread, change along the circumferential direction at a predetermined interval.

2. The pneumatic tire for heavy load as described in claim 1, further comprising circumferential thin grooves at the outer sides of the opposite-side circumferential main grooves.

3. The pneumatic tire for heavy load as described in claim 1, wherein, when a maximum groove cross-sectional area S indicates the area of a quadrangle formed by the respective edges of the ribs at the sides of the corresponding circumferential main groove and respective intersection points at which a parallel line in contact with the deepest groove portion and parallel to the surface of the tread perpendicularly intersects the perpendicular lines perpendicular or approximately perpendicular to the surface of the tread and passing through the edges, an effective groove cross-sectional area S' corresponding to a portion forming the circumferential main groove across the entire circumstance of the tread satisfies $S' \geqq 0.45S$.

4. The pneumatic tire for heavy load as described in claim 1, wherein groove walls of the ribs include multiple sipes.

5. The pneumatic tire for heavy load as described in claim 1, wherein each of the ribs is not provided with sipes across the entirety of the rib in the width direction thereof, or is provided with the sipes each having a cross-sectional area equal to or smaller than a half of a cross-section of the rib in the width direction thereof.

* * * * *